United States Patent Office 3,284,466
Patented Nov. 8, 1966

3,284,466
PREPARATION OF MONOMERIC DISULFIDES
Norman A. Rosenthal, Tuxedo, N.Y., assignor to Thiokol Chemical Corporation, Bristol, Pa., a corporation of Delaware
No Drawing. Filed July 12, 1963, Ser. No. 294,756
12 Claims. (Cl. 260—327)

This invention relates to organic disulfides and more particularly to a novel and improved method of preparing cyclic disulfides.

As is known to those skilled in the art, cyclic disulfides are useful as monomers in a variety of polymerization processes to produce plastic products that can be used for many purposes. The production of homopolymers of the cyclic disulfides is disclosed, for example, in Davis Patent No. 2,657,198. In addition, the cyclic disulfides can be copolymerized with such materials as formaldehyde to produce high molecular weight plastics for molding applications.

Various methods of making the cyclic disulfides have been proposed. It has been suggested that organic dihalides be reacted with sodium polysulfide to form cyclic disulfides and that organic dithiols be cyclized by oxidation with a suitable oxidant. However, those reactions are generally unsatisfactory from a commercial standpoint because the predominant reaction in each case is a linear polymerization. Moreover, to the extent that cyclic disulfides are formed, they tend to homopolymerize to form linear polysulfide polymers, and hence the yield of cyclic compounds is very low.

The reaction of cyclic disulfides to form linear polysulfides appears to be reversible with the equilibrium products consisting largely of linear materials. In an effort to utilize the reversibility of this reaction, it has been proposed that polymeric polyalkylene polysulfides be heated in the presence of alkali to degrade the polymer and steam distill cyclic disulfides therefrom. Such a process is disclosed in, for example, U.S. Patent No. 2,715,635. However, this is a relatively slow and laborious process which commonly produces very low yields of cyclic material.

It is accordingly an object of the present invention to provide a process for making cyclic disulfides that is simpler and more efficient than those previously proposed. It is another object of the invention to provide a process from which relatively high yields of relatively pure cyclic disulfides can be obtained. A further object is to provide a process which is adapted to be used in producing a wide variety of cyclic disulfides. Other objects of the invention will be in part obvious and in part pointed out hereafter.

The objects and advantages of the present invention can be achieved in general by reacting controlled amounts of inorganic monosulfides or polysulfides with certain difunctional organic compounds to form cyclic disulfides and separating the cyclic compound from the other reaction products before any substantial amount of polymerization of the cyclic material can occur. The separation of the cyclic compound is preferably effected by steam distillation of the reaction mixture, although in some cases, as for example where the volatility of the product is low, other separating techniques, such as solvent extraction, may be used.

The difunctional organic starting materials may be represented by the general formula

X—S—CH$_2$—R—CH$_2$—S—X wherein "R" is an aliphatic radical of 1 to 7 atoms selected from the group consisting of C, S, O, Si and N, and "X" is a functional group reactive with inorganic sulfides to effect ring closure of the aliphatic chain.

Typical examples of "R" radicals falling within the scope of the above formula are: —[CH$_2$]$_n$— wherein "$n$" has an integral value from 1 to 7, —CH$_2$OCH$_2$—, —CH$_2$OCH$_2$OCH$_2$—, —CH$_2$SCH$_2$— —CH$_2$SCH$_2$SCH$_2$—, —CH=CH—, —CH$_2$NHCH$_2$—, —Si(CH$_3$)$_2$—O—Si(CH$_3$)$_2$— and

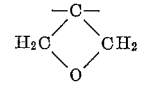

Typical examples of "X" groups falling within the scope of the above formula are: —SO$_3$Na, —CN, —NH$_2$, —Cl, —Br, —I, —SH, —C(NH$_2$)NH, —SR', —SOR', —SO$_2$R'

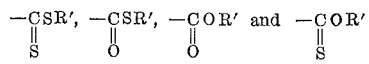

wherein "R'" is an aliphatic or aromatic hydrocarbon which may be substituted with groups that are not more reactive with the inorganic mono- or polysulfides than the entire radical "X."

The overall generalized chemical reaction can be illustrated by the following equation:

(I)

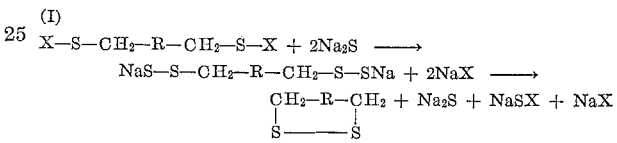

wherein "R" and "X" stand for a member of the groups designated above, respectively. Although other inorganic sulfides, particularly the alkali metal sulfides, are suitable, sodium monosulfide has been used in the equation since it is a preferred species of inorganic sulfide. As previously mentioned, inorganic polysulfides are also effective reactants, especially in the presence of hydroxide ions which reduce the polysulfide to monosulfide.

In one embodiment of the invention, an inorganic monosulfide or polysulfide is slowly added to an aqueous solution of the difunctional organic starting material in a suitable vessel until a readily discernible cloudy precipitate of cyclic disulfide and polymeric products form, at which time the sulfide addition is stopped. The tolerable amount of polymeric material in the reaction system is the amount which will remain dispersed in latex condition without coagulating. Steam is used to distill the cyclic disulfide product from the reaction vessel. The polymeric product, which will not be steam distilled, is simultaneously decomposed into distillable cyclic disulfide product by the inorganic sulfides in the system. As the polymeric product is degraded and the cyclic product is distilled off, the turbidness of the reaction system will disappear and the cycle of inorganic sulfide addition and distillation can be repeated until the stoichiometric amount of the inorganic sulfide, based on the amount of difunctional organic starting material, has been added. Thus the rate of addition of inorganic sulfide and the rate of removal of cyclic disulfide are correlated to prevent any substantial accumulation of cyclic material in the reaction mixture.

It should be apparent that the above described process can be performed continuously, rather than intermittently, by accurately controlling the inorganic sulfide addition rate and the cyclic disulfide product removal rate.

In another embodiment of the invention, solvent extraction may be employed as the means for removing the cyclic disulfide product by using a solvent which is capable of dissolving the cyclic product, but not the polymeric product, to form a solution which is immiscible with, and of lesser density than, the aqueous reaction medium. Extraction is desirable particularly in those instances where the cyclic disulfide product has a relatively low volatility or a high molecular weight, or both. The solvent, suitably ethyl ether or hexane, is introduced at the bottom of the reaction vessel and passes upward through the aqueous reaction medium to form an upper solvent-cyclic disulfide product phase which can be removed from the reaction vessel. It should be noted that the inorganic sulfide may be added and the extracted cyclic disulfide product may be removed as steps of a cycle which is repeated, or simultaneously as a continuous process by controlling the addition and removal rates, until the stoichiometric amount of the inorganic sulfide has been added to the difunctional organic starting material.

The temperature at which the reaction is conducted has not been found to be critical. However, better yields are generally obtainable at reaction temperatures above room temperature since the polymeric products are more efficiently degraded to distillable cyclic disulfide products at such temperatures. The temperature at which the cyclic products steam distill from the reaction system, i.e., approximately 100° C., is commonly near the desirable temperatures and, therefore, the steam distillation temperature is the preferred reaction temperature. The temperature at which the cyclic disulfide is steam distilled can be varied by varying the pressure on the system.

An aqueous medium is desirably used as the reaction medium in view of the ionic reaction between the inorganic sulfide and the difunctional organic starting materials. An organic cosolvent which is miscible with water may also be used. Alcohol and glycol are examples of preferred cosolvents.

Alpha, omega-bis-(thiosulfate)-alkylenes and substituted alkylenes, hereinafter referred to as di Bunte salts, are particularly efficient difunctional organic starting materials. These di Bunte salts have the formula $$MSO_3-S-CH_2-R-CH_2-S-SO_3M$$

wherein "R" is an aliphatic radical of 1 to 7 atoms selected from the group consisting of C, S, O, Si and N, and "M" is a monovalent metal ion, preferably sodium. They are readily prepared by reacting an appropriate organic dihalide, e.g., $Cl-CH_2-R-CH_2-Cl$, with an excess of sodium thiosulfate according to methods similar to the one disclosed in U.S. Patent No. 2,875,182. These di Bunte starting materials are advantageous in that they can be easily isolated, purified, crystallized and then stored for subsequent use. More conveniently, however, the cyclic disulfide product can be prepared according to the present invention by adding the inorganic sulfides directly to the reaction product mixture of the di Bunte salts. Thus, the entire process may be performed sequentially or continuously, and may be summarized by the following equations:

(II)

$$2Na_2S_2O_3 + Cl-CH_2-R-CH_2-Cl \longrightarrow$$
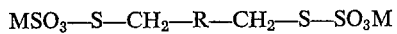
$$NaSO_3S-CH_2-R-CH_2-SSO_3Na + 2NaCl$$

(III)

$$NaSO_3S-CH_2-R-CH_2-SSO_3Na + Na_2S \longrightarrow$$

(IV)

Net:  $Na_2S_2O_3 + Cl-CH_2-R-CH_2-Cl + Na_2S \longrightarrow$

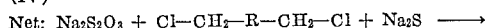
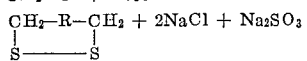

Since the sodium sulfite can be readily converted to sodium thiosulfate by $Na_2S_z$ which is reduced to $Na_2S_{z-1}$, wherein "z" has an integral value of at least 2, only fresh dihalide organic starting material and $Na_2S_z$ need to be added to the reaction mixture in order to continue the reaction indefinitely.

In order to point out more fully the nature of the present invention the following specific examples are given to illustrate embodiments of the present process.

*Example 1*

A two liter, three-necked reaction pot equipped with a condenser, thermometer, addition funnel and steam addition tube was charged with 48.6 gms. (0.15 mol) of the 1,4-di Bunte salt of butene-2 dissolved in 400 mls. of distilled water. The reactor was heated to about 80° C. and steam was introduced to pass through the di Bunte salt solution until water distilled from the solution at a constant rate. A portion of a solution containing 36.0 gms. (0.15 mol) of sodium monosulfide ($Na_2S \cdot 9H_2O$) dissolved in 200 mls. of distilled water was then slowly added dropwise into the reactor until the reaction mixture became cloudy, at which time the addition was stopped. The distillate at this time was also cloudy. The reaction mixture and distillate gradually became clear as the cyclic disulfide product steam distilled from the reaction system, and the addition of sodium monosulfide was then resumed. The entire sodium monosulfide solution was added in this discontinuous manner over a period of several hours. At the end of that period and after the reaction mixture and distillate returned to a clear state, the distillate was extracted with ether. The ether extract was then dried and the ether was allowed to evaporate in a Rota Vac drier to obtain a concentrated crude reaction product. The concentrate was dried over/Drierite and was distilled at a pot temperature of 45.5° C. to yield 3.1 gms. of liquid 1,2-dithiacyclohexene-4 product and 0.9 gm. of residue. The product contained 54.14% sulfur, and had a boiling point of 53° C. at 1.9 mm. Hg, a refractive index of 1.6664 $n_D^{25}$, and a gas chromatography retention time of 6.00 minutes. The absorbance of a product sample in the ultraviolet region of the spectrum at 285 m$\mu$ was 0.253 for a concentration of 0.1076 gram per liter of methanol in a 1 milliliter cell. The product when kept in a clear glass jar at room temperature for a few day polymerized to a dark grey, hard, rubbery polymer.

*Example 2*

Apparatus as described in Example 1 was charged with 500 mls. of an approximately 0.65 molar solution of the 1,5-di Bunte salt of n-pentane and 108 gms. of sodium monosulfide dissolved in 600 mls. of water in the manner described in Example 1. The product, 1,2-dithiacycloheptane, was obtained in two cuts of the distillate and the cuts had the following properties:

| | Weight, gms. | U.V. Spectrum | Boiling Point | Gas Chromatography Retention Time, mins. |
|---|---|---|---|---|
| Cut #1 | 24.6 | 0.930 A. at 261 m$\mu$. | 53–54° C. at 0.8 mm. Hg. | 13.13 |
| Cut #2 | 1.8 | | 57–59° C. at 2.5 mm. Hg. | 13.37 |

| Analyses | Actual | | Calculated |
|---|---|---|---|
| | Cut #1 | Cut #2 | |
| Percent C | 44.92 | 44.94 | 44.8 |
| Percent S | 47.92 | 47.78 | 47.8 |
| Percent H | 7.56 | 7.45 | 7.46 |

A polymeric residue weighing 11.8 gms. was recovered from the distillation pot and contained 50.25% sulfur.

*Example 3*

Apparatus as described in Example 1 was charged with 500 mls. of an approximately 0.5 molar aqueous solution of the 1,6-di Bunte salt of n-hexane and reacted with 108 gms. of sodium monosulfide following the procedure described in Example 1. The product, 1,2-dithiacyclooctane, was obtained as a second distillation cut at 38° C. at 0.3 mm. Hg and weighed 9.6 gms. The product had an ultraviolet spectrum of 0.512 A. at 261 mμ, a molecular weight of 138, a boiling point of 62° C. at 1.0 mm. Hg, and a gas chromatography retention time of 8.50 minutes. Analysis of the product showed it contained 41.70% sulfur, 40.60% carbon and 5.55% hydrogen. A polymeric residue weighing 16.8 gms. was recovered from the distillation pot, contained 42.66% sulfur and had a molecular weight of 1775.

*Example 4*

A solution of 88.5 gms. (0.25 mol) of 3,3-bis-(sodium-thiosulfate-methyl)-oxacyclobutane in 400 mls. of water was reacted in apparatus and according to the procedure described in Example 1 with 108 gms. of sodium monosulfide dissolved in 600 mls. of water. The brief cloudiness in the reaction mixture and distillate after the addition of the sodium monosulfide was yellow. The ether of the ether extracted distillate was allowed to evaporate slowly without heat or vacuum to avoid polymerizing the monomeric product. The product thus obtained, 2-oxa-6,7-dithiaspiro-(3,4)-octane, was a yellow crystalline material, weighed 19.2 gms., boiled at 53.5–54° C., had a molecular weight of 148 and showed an ultraviolet spectrum of 0.232 A. at 340 mμ at a sample concentration of 0.3388 gm./l. Analysis of the product showed the following composition:

|  | Actual | Calculated |
|---|---|---|
| Percent C | 42.28 | 40.5 |
| Percent H | 6.60 | 5.4 |
| Percent S | 42.12 | 43.2 |
| Percent O |  | 10.8 |

*Example 5*

The β,β'-di Bunte salt of diethyl formal was prepared by reacting 1240.0 gms. of sodium thiosulfate, 8.3 gms. of sodium carbonate and 348 gms. of bis(β-chloroethyl) formal in 2000 mls. of tap water in a 5 liter, three-necked flask equipped with a stirrer, thermometer and condenser. The mixture was reacted for 5 hours at 82° C. and then at 93° C. for one hour after which the reaction mixture was cooled to room temperature. Five hundred mls. of the formal di Bunte salt solution thus prepared were reacted according to the method described in Example 1 with 60 gms. (0.25 mol) of sodium monosulfide dissolved in 200 mls. of water. A clear amber liquid weighing 13.5 gms. was recovered from the ether extract. The product, 1,2-dithia-5,7-dioxacyclononane, was obtained by distillation at 84° C. at 1.2 mm. Hg and weighed 10.7 gms. The cyclic product had a refractive index of 1.5644 $n_D^{25}$, a molecular weight (found) of 163, a gas chromatography retention time of 3.25 minutes, an ultraviolet spectrum of 0.383 A. at 242 mμ at a concentration of 0.1356 gm./l., and a sulfur content of 38.92% compared to 38.6% calculated. A polymeric material weighing 5.0 gms. and containing 59.90% sulfur was also recovered.

*Example 6*

A crude β,β'-di Bunte salt of ethyl ether weighing 200 gms. (0.25 mol) and 400 mls. of water were charged into a reaction pot equipped like the one described in Example 1. To insure the alkalinity of the solution, 5 mls. of phenolphthalein solution were added to the di Bunte salt solution which then turned red. The solution was heated to boiling and then steam was passed through the solution. Approximately one-third of a solution of 60.0 gms. (0.25 mol) of sodium monosulfide in 200 mls. of water was added to the reactor causing the reaction mixture and the distillate to become cloudy. The remainder of the sodium monsulfide solution was then added slowly as described in Example 1, and because the distillate remained cloudy, a second monosulfide solution was prepared and added slowly until the reaction mixture and the distillate became clear. The distillate collected was then extracted several times with ethyl ether and the ether in the extract was allowed to evaporate in a rotary-vacuum drier. 43.6 gms. of a crude cyclic disulfide, 1,2-dithia-5-oxacycloheptane were obtained. A polymer weighing 1.2 gms. formed in the reaction pot. The following fractions were obtained by distillation of the crude product:

| Cut #1 | 30.0 gms | Refractive index $n_D^{25}$=1.5798. |
|---|---|---|
| Cut #2 | 6.1 gms | Refractive index $n_D^{25}$=1.5792. |
| Residue | 4.5 gms | Refractive index $n_D^{25}$=1.5793. |
| | 40.6 gms.=82.5% yield. | |

The product in Cut #1 had a boiling point of 70–72° C. at 2.5 mm. Hg, an ultraviolet spectrum of 0.348 A. at 265 mμ at a concentration of 0.0140 gm./l., and a molecular weight of 132, and contained 47.2% sulfur compared to 47.1% calculated.

*Example 7*

A solution of 32 gms. (0.1 mol) of the 1,5-di Bunte salt of 3-aza-n-pentane was reacted with 24 gms. of sodium monosulfide according to the procedure described in Example 1. The reaction mixture became yellow-green when the first portions of the sodium monosulfide were added, but became clear in a few minutes. The distillate was slightly cloudy at this point. The reaction mixture and distillate became very cloudy when about two-thirds of the monosulfide had been added. After all the monosulfide had been added the reaction mixture and distillate became clear, the distillate was extracted with ethyl ether and the extract treated as in Example 1. A thin liquid film formed on the wall of the extraction flask and was removed with concentrated hydrochloric acid which converted the film to a white solid. The solid material was filtered, washed with 95% ethanol and dried to yield 0.4 gms. of N-chloro-1,2-dithia-5-azacycloheptane which had the following composition:

| Analysis | Actual | Calculated |
|---|---|---|
| Percent C | 27.9 | 28.1 |
| Percent H | 6.17 | 5.84 |
| Percent S | 37.6 | 37.4 |
| Percent Cl | 20.6 | 20.7 |
| Percent N | 7.61 | 8.16 |

The monomer decomposed at about 300° C.

*Example 8*

A solution of 304.6 gms. (4.0 mols) of ammonium thiocyanate in 800 mls. of ethanol (95%) was heated to 85° C. and then 286.0 gms. of bis-(β-chloro)-ethyl ether were added dropwise to the solution during a 0.75 hour period. The reaction mixture was then heated at about 90° C. for 9 hours and then 119 gms. of ammonium chloride which formed during that period were filtered from the reaction system. The ethanol solvent was distilled from the reaction mixture and an additional 48 gms. of ammonium chloride were recovered. A crude bis-(β-thiocyano)-ethyl ether product weighing 287.0 gms. was thus prepared and 188 gms. (1 mol) of that product were reacted in a steam distillation flask with 244 gms. (1 mol) of sodium monosulfide added dropwise. The steam distillate was extracted with ethyl ether and the extract was distilled to obtain 17 gms. of crude 1,2-dithia-5-oxacycloheptane. The crude product had a refractive index of 1.5250 $n_D^{24.5}$ and a boiling point of 58–62° C. at 1 mm. Hg. The crude product was redistilled, and gas chromatographic analysis showed it was 93% pure and had a boiling point of 69–69.5° C. at 1.5 mm. Hg and a refractive index of 1.5711 $n_D^{25}$. The values for these properties compare closely to the values for the same product obtained in Example 6. The reaction flask contained 10 gms. of polymeric materials.

*Example 9*

Apparatus and procedure similar to those described in

Example 1 were used to react 225 gms. (1 mol) of crude 1,7-bis-(thiocyano)-3,5-dioxa-n-heptane with 240 gms. of sodium monosulfide (Na$_2$S·9H$_2$O). The distillate was extracted with ethyl ether and the extract was distilled to yield 7.7 gms. of 1,2-dithia-5,7-dioxacyclononane. The cyclic product had a boiling point of 82–92° C. at atmospheric pressure and a refractive index of 1.5582 $n_D^{24.5}$. 17.2 gms. of a lower boiling fraction were also obtained.

*Example 10*

188.0 gms. (1 mol) of bis-(β-thiocyano)-ethyl ether were reacted with 240 gms. (1 mol) of sodium monosulfide (Na$_2$S·9H$_2$O) following the procedure described in example 1. The steam distillate was extracted with ether and then with benzene to remove an ether-insoluble oil. Excess ether was evaporated under vacuum and the remainder of the ether extract was distilled. The 1,2-dithia-5-oxacycloheptane product obtained weighed 16.7 gms., had a boiling point of 58–62° C. and a refractive index of 1.5700 $n_D^{24.5}$. 1.2 gms. of lower boiling materials and 10 gms. of higher boiling materials were also obtained.

*Example 11*

Apparatus and procedure similar to those described in Example 1 were used in reacting 25 gms. of the 1,5-di Bunte salt of (2,2,4,4-tetramethyl)-2,4-disilico-3-oxa-n-pentane dissolved in 400 mls. of water with 24 gms. of sodium monosulfide dissolved in 200 mls. of water. A heavy, water-insoluble steam distillate was extracted with ether. The extract was dried and concentrated, and the concentrate was distilled under vacuum. The distillate cuts had the following properties:

| Cut Number | Boiling Point, °C. | At Pressure, mm. Hg | Yield, gms. | Refractive Index $n_D^{25}$ |
|---|---|---|---|---|
| 1 | 44–55 | 0.8–1.0 | 3.5 | 1.4620 |
| 2 | 56–63 | 0.8–1.3 | 1.3 | 1.4812 |
| 3 | 65–72 | 1.0 | 14.7 | 1.4727 |
| 4 | 72–100 | 1.3 | 1.6 | 1.4205 |
| Residue | | | 2.5 | 1.4212 |

Analysis of the product in Cut #3 (1,1,3,3-tetramethyl)-1,3-disilico-2-oxa-5,6-dithiacycloheptane, showed it contained 20.8% sulfur and 21.7% silicon, had a molecular weight of 239 compared to 224 calculated and an ultraviolet spectrum of 0.174 A. at 259 mμ at a concentration of 0.1720 gm./l.

It is of course to be understood that the foregoing examples are intended to be illustrative only and that numerous changes can be made in the ingredients, proportions and conditions set forth therein without departing from the spirit of the invention as set forth in the appended claims.

I claim:

1. A method of making a cyclic disulfide which comprises slowly adding an alkali metal sulfide to a solution of an organic compound having the general formula

X—S—CH$_2$—R—CH$_2$—S—X wherein R is a member selected from the group consisting of —Si(CH$_3$)$_2$—O—Si(CH$_3$)$_2$—,

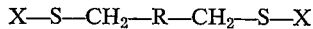
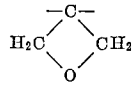

and

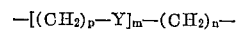

—[(CH$_2$)$_p$—Y]$_m$—(CH$_2$)$_n$— wherein Y is a member selected from the group consisting of —O—, —S—, —NH— and —CH=CH—, $n$ is an integer of 0 to 7, $m$ is an integer of 0 to 2 and $p$ is an integer of 0 to 2, provided that the total number of carbon, oxygen, sulfur and nitrogen atoms in said member is 1 to 7, and wherein X is a member selected from the group consisting of —SO$_3$Na, —CN, —NH$_2$, —Cl, —Br, —I, —SH and —C(NH$_2$)NH, to effect ring closure of the aliphatic radical to form a cyclic disulfide of the structure

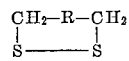

and removing said cyclic disulfide from said solution, the rate of addition of said alkali metal sulfide being regulated to prevent substantial polymerization of said cyclic disulfide before it is removed from said solution.

2. A method according to claim 1 and wherein X is the —SO$_3$Na radical.

3. A method according to claim 1 and wherein X is the —CN radical.

4. A method according to claim 1 and wherein R is the —(CH$_2$)$_n$— radical wherein $n$ has an integral value of 1 to 7.

5. A method according to claim 1 and wherein R is the —CH$_2$—O—CH$_2$— radical.

6. A method according to claim 1 and wherein R is the —CH$_2$—O—CH$_2$—O—CH$_2$— radical.

7. A method of making a cyclic disulfide which comprises slowly adding an alkali metal polysulfide to a solution of an organic compound having the general formula

X—S—CH$_2$—R—CH$_2$—S—X wherein R is a member selected from the group consisting of —Si(CH$_3$)$_2$—O—Si(CH$_3$)$_2$—,

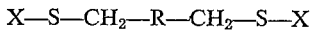
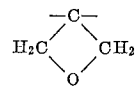

and

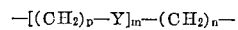

—[(CH$_2$)$_p$—Y]$_m$—(CH$_2$)$_n$— wherein Y is a member selected from the group consisting of —O—, —S—, —NH— and —CH=CH—, $n$ is an integer of 0 to 7, $m$ is an integer of 0 to 2 and $p$ is an integer of 0 to 2 provided that the total number of carbon, oxygen, sulfur and nitrogen atoms in said member is 1 to 7, and wherein X is a member selected from the group consisting of —SO$_3$Na, —CN, —NH$_2$, —Cl, —Br, —I, —SH and —C(NH$_2$)NH to effect ring closure of the aliphatic radical to form a cyclic disulfide of the structure

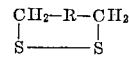

said solution containing a reducing agent to reduce said polysulfide to monosulfide, and removing said cyclic disulfide from the solution, the rate of addition of said alkali metal polysulfide being regulated to prevent substantial polymerization of said cyclic disulfide before it is removed from said solution.

8. A method of making a monomeric cyclic disulfide which comprises slowly adding an alkali metal sulfide to a solution of an organic compound having the formula

X—S—CH$_2$—R—CH$_2$—S—X wherein "R" is a member selected from the group consisting of —[CH$_2$]$_n$— wherein $n$ is an integer of 1 to 7,

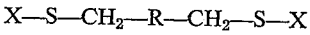
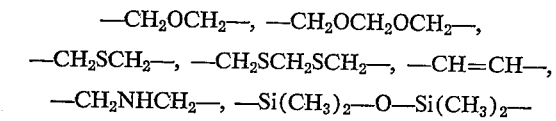

and

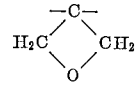

and wherein "X" is a member selected from the group consisting of —SO$_3$Na and —CN radicals to form a cyclic disulfide of the structure $$\begin{array}{c}CH_2-R-CH_2\\|\qquad\quad|\\S\text{———}S\end{array}$$

and removing said cyclic disulfide from said solution, the rate of addition of alkali metal sulfide being regulated to prevent substantial polymerization of said cyclic disulfide before it is removed from said solution.

9. A method of making a monomeric cyclic disulfide which comprises slowly adding an alkali metal monosulfide to an aqueous solution of an organic compound having the formula $$X-S-CH_2-R-CH_2-S-X$$

wherein "R" is a member selected from the group consisting of —[CH$_2$]$_n$— wherein $n$ is an integer of 1 to 7,

—CH$_2$OCH$_2$—, —CH$_2$OCH$_2$OCH$_2$—,

—CH$_2$SCH$_2$—, —CH$_2$SCH$_2$SCH$_2$—, —CH=CH—,

—CH$_2$NHCH$_2$—, —Si(CH$_3$)$_2$—O—Si(CH$_3$)$_2$— and $$\begin{array}{c}-C-\\H_2C\diagup\quad\diagdown CH_2\\\diagdown\quad\diagup\\O\end{array}$$

and wherein "X" is a member selected from the group consisting of —SO$_3$Na and —CN radicals to form a cyclic disulfide of the structure $$\begin{array}{c}CH_2-R-CH_2\\|\qquad\quad|\\S\text{———}S\end{array}$$

and removing said cyclic disulfide from said solution, the rate of addition of alkali metal monosulfide being regulated to prevent substantial polymerization of said cyclic disulfide before it is removed from said solution.

10. A method according to claim 9 and wherein said cyclic disulfide is removed from said solution by steam distillation.

11. A method according to claim 9 and wherein said cyclic disulfide is removed from said solution by extraction with a solvent immiscible with said solution.

12. A method according to claim 9 and wherein said aqueous solution contains an organic solvent miscible with water.

References Cited by the Examiner

UNITED STATES PATENTS 2,715,635  8/1955  Davis _____ 260—327
2,792,406  5/1957  Acker _____ 260—327

FOREIGN PATENTS 952,636   3/1964  Great Britain.
37–13993  9/1962  Japan.

OTHER REFERENCES

Affleck et al.: Jour. of Org. Chem., vol. 15 (1950), pages 865–8.

Bennett: Transactions of the Faraday Society, vol. 35 (1941), pages 794–7.

Boyland et al.: Jour. Chem. Soc. (1961), pages 679–683.

Gunther et al.: Jour. Amer. Chem. Soc., vol. 82 (1960), pages 2762–5.

WALTER A. MODANCE, *Primary Examiner.*

JOHN D. RANDOLPH, *Examiner.*

J. A. PATTEN, *Assistant Examiner.*